United States Patent
Radisson et al.

(10) Patent No.: US 12,399,155 B2
(45) Date of Patent: Aug. 26, 2025

(54) DEVICE FOR INSPECTING A PIPE, IN PARTICULAR WITH REGARD TO CLANDESTINE TAPPING

(71) Applicant: SOCIETE DES TRANSPORTS PETROLIERS PAR PIPELINE TRAPIL, Paris (FR)

(72) Inventors: Marc Radisson, Saint-Prix (FR); Stephane Benichou, Mlliers le Bel (FR)

(73) Assignee: SOCIETE DES TRANSPORTS PETROLIERS PAR PIPELINE TRAPIL, Puteaux (FR)

( * ) Notice: Subject to any disclaimer, the term of this patent is extended or adjusted under 35 U.S.C. 154(b) by 259 days.

(21) Appl. No.: 17/902,011

(22) Filed: Sep. 2, 2022

(65) Prior Publication Data
US 2023/0076535 A1 Mar. 9, 2023

(51) Int. Cl.
*G01N 29/04* (2006.01)
*G01N 29/11* (2006.01)
*G01N 29/265* (2006.01)

(52) U.S. Cl.
CPC ........... *G01N 29/043* (2013.01); *G01N 29/11* (2013.01); *G01N 29/265* (2013.01);
(Continued)

(58) Field of Classification Search
CPC .... G01N 29/043; G01N 29/11; G01N 29/265; G01N 2291/0289; G01N 2291/056; G01N 2291/106; G01N 2291/2636
(Continued)

(56) References Cited

U.S. PATENT DOCUMENTS

| 5,963,042 A | 10/1999 | Suyama et al. |
| 6,243,657 B1 | 6/2001 | Tuck et al. |

(Continued)

FOREIGN PATENT DOCUMENTS

| CN | 110618197 A | 12/2019 | |
| DE | 10202432 A1 * | 8/2003 | ............. G01N 29/07 |

(Continued)

OTHER PUBLICATIONS

Brockhaus et al., In-line inspection (ILI) methods for detecting corrosion in underground pipelines, Woodhead Publishing Limited, 2014, pp. 255-285 (Year: 2014).*

(Continued)

*Primary Examiner* — Stephanie E Bloss
*Assistant Examiner* — Kevin C Butler
(74) *Attorney, Agent, or Firm* — Harness, Dickey & Pierce PLC

(57) ABSTRACT

A device for inspecting a pipe, includes a scraper carriage, substantially cylindrical about an axis coinciding with an axis of the pipe and which is inserted into the pipe and propelled by a liquid transported by the pipe, and a measurer carried by the carriage. The measurer includes a first crown, carrying a first set of ultrasound transducers, arranged on a first circle centered on the axis and of diameter substantially equal to an inside diameter of the pipe, alternating a transmitting ultrasound transducer and a receiving ultrasound transducer, arranged so that a wave transmitted by a transmitting ultrasound transducer is reflected, by a wall of the pipe facing it, towards a counterpart receiving ultrasound transducer.

14 Claims, 3 Drawing Sheets

(52) U.S. Cl.
CPC ............... *G01N 2291/0289* (2013.01); *G01N 2291/056* (2013.01); *G01N 2291/106* (2013.01); *G01N 2291/2636* (2013.01)

(58) Field of Classification Search
USPC .......................................................... 73/592
See application file for complete search history.

(56) References Cited

U.S. PATENT DOCUMENTS

| | | | | |
|---|---|---|---|---|
| 6,474,165 | B1* | 11/2002 | Harper | G01N 29/2487 73/628 |
| 7,698,937 | B2* | 4/2010 | Neidhardt | E21B 47/08 73/152.57 |
| 8,438,929 | B2* | 5/2013 | Metala | G01M 13/00 73/660 |
| 9,188,567 | B2* | 11/2015 | MacLauchlan | G01N 29/44 |
| 2003/0136195 | A1* | 7/2003 | Krieg | G01N 29/341 73/628 |
| 2009/0101337 | A1* | 4/2009 | Neidhardt | E21B 47/08 166/250.01 |
| 2012/0055255 | A1* | 3/2012 | Metala | G01M 13/00 73/660 |
| 2016/0025684 | A1* | 1/2016 | Deneuville | G01N 29/262 73/622 |
| 2021/0255150 | A1* | 8/2021 | Radisson | G01N 29/262 |
| 2023/0076535 | A1* | 3/2023 | Radisson | G01N 29/11 |

FOREIGN PATENT DOCUMENTS

| | | | | |
|---|---|---|---|---|
| EP | 1333277 | A2 | 8/2003 | |
| EP | 3865868 | A1 * | 8/2021 | ............... F17D 5/06 |
| FR | 3003646 | A1 * | 9/2014 | ........... G01N 29/225 |
| FR | 3096752 | A1 * | 12/2020 | ............... F17D 5/02 |
| GB | 2020023 | A | 7/1979 | |
| GB | 2332274 | A * | 6/1999 | ......... G01N 29/2487 |
| JP | 2013212069 | A * | 10/2013 | |
| JP | 2015033404 | A * | 2/2015 | |
| JP | 5963042 | B2 * | 8/2016 | |
| JP | 6243657 | B2 * | 12/2017 | |
| KR | 20160025684 | A * | 3/2016 | ............. G01R 33/32 |
| WO | WO-03021249 | A2 * | 3/2003 | ........... G01N 29/225 |
| WO | WO-2005007607 | A2 * | 1/2005 | ........... C07C 51/414 |

OTHER PUBLICATIONS

Brimacombe et al., Circumferential crack detection: challenges, solutions, and results, Proceedings of the 2016 11th International Pipeline Conference IPC2016, Sep. 26-30, 2016, Calgary, Alberta, Canada, pp. 1-7 (Year: 2016).*
Galvagni et al., Reliable identification of damage growth using guided wave SHM systems, 7th European Workshop on Structural Health Monitoring Jul. 8-11, 2014. La Cité, Nantes, France, Jul. 10, 2014, pp. 1720-1727 (Year: 2014).*
Hennig et al., Latest generation of ILI tools for high resolution ultrasonic inspection and integrity assessment, Proceedings of the ASME 2015 India Oil and Gas Pipeline Conference IOGPC2015, Apr. 17-18, 2015, New Delhi, India, pp. 1-5 (Year: 2015).*
Hrncir et al., Abstract—A case study of the crack sizing performance of the ultrasonic phased array combined crack and wall loss inspection tool on the centennial pipeline, the defect evaluation, (Marathon Oil, DNV and GE Oil & Gas), Jul. 1, 2010, p. 4 (Year: 2010).*
International Searching Authority, PCT/EP2022/074324 Written Opinion, Sep. 1, 2022, p. 8 (Year: 2022).*
International Searching Authority, PCT/EP2022/074324 ISR, Sep. 1, 2022, p. 3 (Year: 2022).*
Jose Luiz de Franca Freire et al., Chapter 32: Pipeline Third-Party Damage and Illegal Tapping—Tap Detection Location, Handbook of Pipeline Engineering, ABCM—Brazilian Society of Mechanical Sciences and Engineering, Springer, 2024, pp. 1246-1288 (Year : 2024).*

* cited by examiner

DEVICE FOR INSPECTING A PIPE, IN PARTICULAR WITH REGARD TO CLANDESTINE TAPPING

CROSS-REFERENCE TO RELATED APPLICATION

The present application claims priority to French patent application serial no. 2109200, filed on Sep. 3, 2021, which is incorporated by reference herein.

TECHNICAL FIELD

The invention relates to a device for inspecting a tubular pipe, in particular with regard to clandestine tappings. Such a device is designed to inspect a tubular pipe intended to transport a fluid, in particular a liquid of a homogeneous type. It may be, for example, water, refined hydrocarbons or certain crude oils. Transport pipeline operators must regularly implement means of checking and monitoring the integrity of pipelines within a regulatory framework.

Today transport pipeline operators face a new threat in the form of clandestine tapping. A clandestine tapping is caused by a criminal who pierces the pipe, installs a tapping or a valve connected to a hose at the end of which there is connected a tank, to take the liquid which is being transported. Losses of product stolen by clandestine tapping can represent up to nearly 40% of lost volumes for European refined hydrocarbon transporters.

BACKGROUND

In order to monitor a pipe and its evolution over time, it is known to use means of surveillance operating from outside the pipe: land or air patrols, by humans or drones. These means are very expensive, but can be complementary. It is also known to use a scraper carriage, inserted into the pipe and propelled by a liquid transported by the pipe. Such a scraper carriage thus traverses the pipe to be inspected. It carries sensors to measure pipeline characteristics.

Among the sensors carried, it is known to use an acoustic sensor. Such a sensor passively listens to noises and can deduce certain anomalies. Thus, in the event of a clandestine tapping or leak, it can hear there is a flow. However, it cannot detect clandestine tappings unless fluid is being drawn off.

It is also known to use magnetic flux leak sensors. These sensors can, subject to conditions, make it possible to detect clandestine tapping. However, they involve significant technical and financial constraints. In particular, they require technical expertise both in their implementation and in the exploitation of the results, prohibiting their autonomous use by transport operators.

It is also known to use ultrasound transducers in transmitter/receiver mode, a mode in which a transmitter is also the receiver. Such sensors are used to detect and measure cracks, corrosions, deformations. This technology does not make it possible to detect, in a differentiated way, a clandestine tapping. Also, it is appropriate to propose a device capable of detecting, identifying and locating a clandestine tapping.

SUMMARY

Accordingly, the invention provides a device for inspecting a pipe notably as regards clandestine tappings or the determination of leaks linked to deformations due to geographical incidents, comprising a scraper carriage, substantially cylindrical about an axis substantially coinciding with an axis of the pipe which is inserted into the pipe and propelled by a liquid transported by the pipe, and measuring means carried by said carriage, wherein the measuring means comprise a first crown, carrying a first plurality of ultrasound transducers, arranged on a first circle centered on the axis and of diameter substantially equal to a diameter of the pipe, alternating a transmitting ultrasound transducer and a receiving ultrasound transducer, arranged so that a wave transmitted by a transmitting ultrasound transducer is reflected, by a wall of the pipe facing it, towards a counterpart receiving ultrasound transducer.

Some further features or particular embodiments, which can be used alone or in combination are the following:

- transmitting ultrasound transducers, respectively the receiving ultrasound transducers, are angularly evenly distributed on the first circle.
- first crown also carries at least a second plurality of ultrasound transducers, arranged on at least a second circle centered on the axis and of diameter substantially equal to a diameter of the pipe, each ultrasound transducer being offset by an angle, measured about the axis, which is constant relative to an ultrasound transducer of a preceding plurality of transducers, the angle being preferably less than 1°, and even more preferably equal to 0.7°.
- the device further comprises at least a second crown similar to the first crown, angularly offset about the axis, so that its ultrasound transducers are staggered relative to the ultrasound transducers of the first crown.
- the device further comprises a processing unit, capable of storing measurements.
- the device further comprises an inertial unit, capable of measuring three angles of orientation of the scraper carriage.
- the device further comprises a battery, capable of ensuring energy autonomy for the carriage.

The invention further provides, in a second aspect a method for detecting a tapping in a pipe by means of a device as above comprising the following steps: for at least one pair of counterpart ultrasound transducers, control of the transmitting ultrasound transducer to emit a pulse, measurement by means of the counterpart receiving ultrasound transducer of the pulse reflected by the pipe wall, analysis of the measurements, a possible tapping being diagnosed if a reflected pulse has a particular signature indicative of a tapping.

Some further features or particular embodiments, which can be used alone or in combination are the following:

- a particular signature comprises an absence of a reflected pulse or an attenuated reflected pulse and/or a resemblance to a signature of a tapping measured on a characterization testbench and/or a non-resemblance to a signature, of something other than a tapping, measured on the characterization testbench.
- the method further comprises the steps of: confirming a possible tapping, in that it is reproduced on one or more pairs of counterpart ultrasound transducers, neighboring the pair of ultrasound transducers that detected the possible tapping.

The invention will be better understood on reading the following description, given solely by way of example, and with reference to the appended drawings.

DETAILED DESCRIPTION OF EMBODIMENTS

Figure 1:
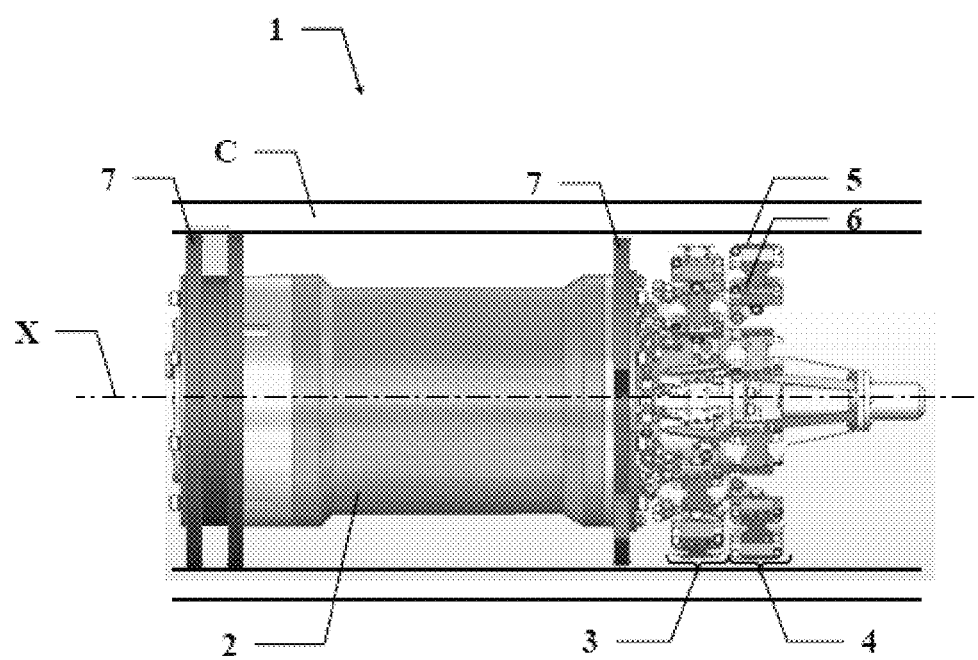
FIG. 1 shows a device in side view.

Referring to FIG. 1, the invention provides a device 1 for inspecting a pipe C. The device 1 comprises a scraper carriage 2. This carriage 2 is substantially cylindrical about an axis X. It is capable of being inserted into the pipe C at an upstream end of the latter. When carriage 2 is inserted, the X axis substantially coincides with an axis of the pipe C.

Carriage 2 is called a scraper in that it comprises at least one scraper seal 7 capable of closely following the inner wall of the pipe C while setting up a relative seal between upstream and downstream of the scraper carriage 2. This allows carriage 2 to be advantageously propelled by a liquid transported by the pipe C and thus to cover the length of the pipe C until it reaches a downstream end.

The device 1 also comprises measuring means carried by carriage 2. At the downstream end, carriage 2 can be extracted from the pipe C, in order to be able, among other things, to recover the measurements taken during the journey and, if necessary, analyze them.

According to a first characteristic, the measuring means comprise ultrasound transducers 5, 6. The latter are used in a "pitch and catch" mode (because the pulse/echo mode rather designates the use of a transducer which acts as a transmitter and receiver) requiring two counterpart ultrasound transducers 5, 6: a first transmitting ultrasound transducer 5 is used as transmitter and a second receiving ultrasound transducer 6 is used as receiver and is arranged so as to be able to receive the wave transmitted by its counterpart transmitting ultrasound transducer after reflection by/in the wall of pipe C. Also, the two ultrasound transducers 5, 6 are arranged close to the internal wall of pipe C and at a suitable angle for respectively transmitter 5, to emit a wave towards the wall of the pipe C opposite, and for the receiver 6, to receive the reflected wave, resulting from the transmitted wave.

Figure 2:
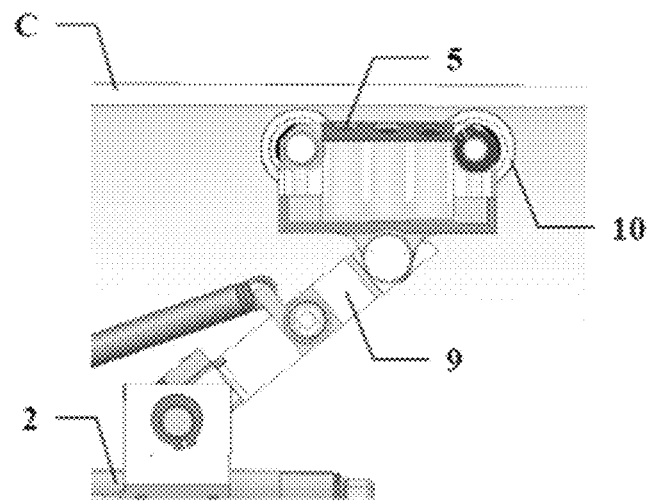
FIG. 2 shows, in side view, detail of a foot carrying an ultrasound transducer.

The ultrasound transducers 5, 6 are arranged not far from, and advantageously as close as possible to, the internal wall of the pipe C. According to one possible embodiment, more particularly illustrated in FIG. 2, the ultrasound transducers 5, 6 are carried by a follower arm 9, articulated to carriage 2 and equipped with rollers 10 able to follow the internal wall of the pipe C.

Advantageously, the ultrasound transducers 5, 6 are organized in the form of a first plurality of ultrasound transducers 5, 6, arranged on a first circle centered on the axis X and of a diameter substantially equal, by a lower value, to the internal diameter of the pipe C. On this first circle, there is an alternating transmitting ultrasound transducer 5 and a receiving ultrasound transducer 6. It follows that this circle carries the same number of transmitter transducers 5 and receiving ultrasound transducers 6. According to a preferred embodiment, a transmitting ultrasound transducer 5 is counterpart with a receiving ultrasound transducer 6 immediately following (or preceding) on the circle.

Figure 3:
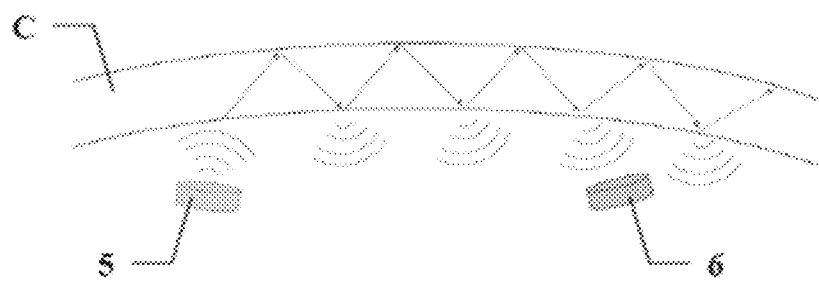
FIG. 3 shows the principle of measurement with two transducers, in the absence of tapping.

FIG. 3 illustrates the use of two counterpart 5, 6 ultrasound transducers. A transmitting ultrasound transducer 5 emits a pulse in the direction of the internal wall of pipe C. In the absence of a disturbing event in pipe C, this pulse propagates in the wall of pipe C and is re-transmitted regularly. It can thus be observed and measured by the counterpart receiving ultrasound transducer 6 correctly arranged.

Figure 4:
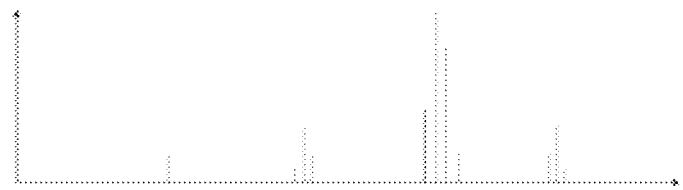
FIG. 4 shows a time graph of the measurement obtained, in the absence of tapping.

FIG. 4 shows a plot of the measurement received by the receiving ultrasound transducer 6, as a function of its position. It can be observed that we measure a simple pulse at the first bounce of the initial pulse, a more diffuse pulse at the second bounce, a larger and more diffuse pulse at the third bounce, a smaller pulse at the fourth bounce. Beyond four rebounds, the initial pulse is damped and nothing is measured (it is the position of the receiver that prevents the reception of the following rebounds).

Figure 5:
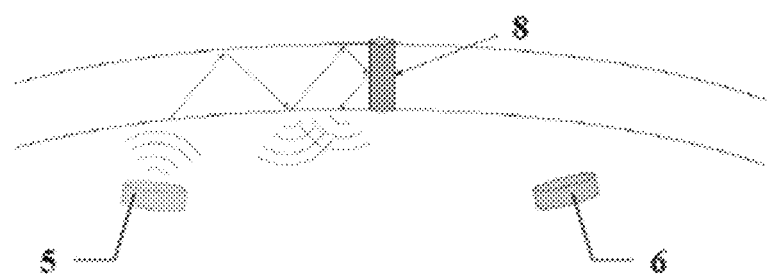
FIG. 5 shows the principle of measurement with two transducers, in the presence of a tapping.

FIG. 5 illustrates the same situation as before, in the presence of a tapping 8 present on pipe C. The tapping constitutes an obstacle to the propagation of the transmitted pulse. Also, the receiving ultrasound transducer 6 does not measure any reflected pulse.

Figure 6:
FIG. 6 shows a time graph of the measurement obtained, in the presence of tapping.

FIG. 6 shows the curve of the measurement received by the receiving ultrasound transducer 6, as a function of its position. It can be observed that we measure a single pulse at the first bounce of the initial pulse, then nothing more. A different behavior thus appears, relative to the previous case without tapping 8, making it possible to distinguish an intact pipe C from a pipe C encumbered by a tapping 8, by analyzing the responses measured.

According to another characteristic, the first plurality, organized on a first circle, is carried by a first crown 3. According to another characteristic, the transmitting ultrasound transducers 5 are evenly angularly distributed over the first circle. The same is true for the receiving ultrasound transducers 6.

The angular distance between a transmitting ultrasound transducer 5 and a receiving ultrasound transducer 6 is determined so as to obtain a good measurement, either for example as a function of the rebounds of the ultrasound pulse within pipe C. Depending on this transmitter/receiver distance an "angular encumbrance or footprint" for a transmitter/receiver pair is determined. The circumference of pipe C can then be divided by this angular footprint to determine a number of counterpart transmitter/receiver pairs that can be arranged on a circumference. These pairs are then angularly equally distributed around the circumference/circle, so as to equally cover the entire surface of the internal wall of pipe C. The number of matched pairs can thus change according to the internal diameter of pipe C.

In order to specify the measurements and diagnoses carried out by the ultrasound transducers 5, 6, it is advantageous for the first crown 3 to still carry at least a second plurality of ultrasound transducers 5, 6, arranged on at least a second circle centered on the axis X and of diameter substantially equal to the diameter of the pipe C. Said at least one second plurality can constitute a redundant set for the first plurality. In order to be able to specify the measurements and diagnoses, it is advantageous for the transducers of said at least one second plurality to have a diversity relative to those of the first plurality. For this, according to one embodiment, each ultrasound transducer 5, 6 of said at least a second plurality is advantageously offset by an angle A, measured about the axis X, relative to an ultrasound transducer 5, 6 by a previous plurality. The angle A is preferably constant. Its value is preferably less than 1°, and even more preferably equal to 0.7°.

Figure 7:
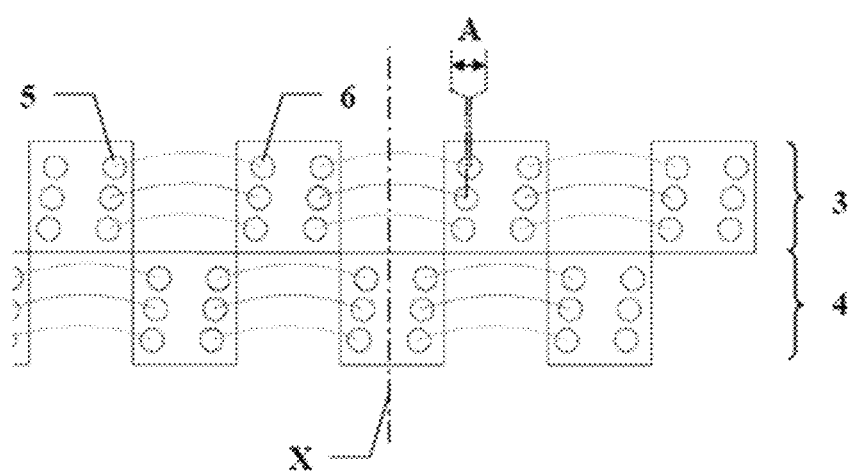
FIG. 7 details the arrangement of pluralities and rings of ultrasound transducers.

As illustrated in the drawings, and more particularly in FIG. 7, the device 1 comprises three successive pluralities, one offset relative to the previous one, by an angle A. Beyond a third plurality/third circle, the gain in accuracy of measurements and diagnostics does not compensate for the increase in cost. Said at least a second plurality is advantageously carried by the first crown 3.

FIG. 7, representing the vertical X axis, shows a first crown 3 comprising pairs of ultrasound transducers 5, 6 distributed over the entire periphery of the pipe C. The first crown 3 comprises 3 pluralities or rings of ultrasound transducers. Each element of the crown 3, here discontinuous, the support for ultrasound transducers, carries three transmitting ultrasound transducers 5 transmitting in the direction of the element that follows it and three receiving ultrasound transducers 6 receiving from the preceding element. Thus, a measurement can be performed to measure/qualify an angular region comprised between a transmitting ultrasound transducer 5 and a counterpart receiving ultrasound transducer 6. In FIG. 7, the counterpart transducers are connected by curved lines.

At the level of an element, between a receiver of a preceding pair and a transmitter of a following pair, a measurement blind spot appears. Also, according to another characteristic, in order to eliminate this blind spot, the device 1 further comprises at least a second crown 4 similar to the first crown 3. The second crown 4 is advantageously angularly offset, about the axis X, relative to the first crown 3 in order to eliminate the blind spot of the first crown by placing it in the region of useful measurement of the second crown 4. An embodiment satisfying this constraint is to arrange the ultrasound transducers 5, 6 of the second crown 4 in staggered rows relative to the ultrasound transducers 5, 6 of the first crown 3, as illustrated in FIG. 7.

According to another characteristic, the device 1 further comprises a processing unit, which is preferably on-board carriage 2. This processing unit is capable of controlling the ultrasound transducers, both the transmitters 5 and receivers 6, storing the measurements and, where appropriate, preprocessing or processing them. The processing unit is further capable of interfacing any other measurement or service equipment on board carriage 2.

According to another characteristic, the device 1 also comprises an inertial unit, preferably on-board carriage 2, able to measure the three angles of orientation of the scraper carriage 2. This makes it possible to know the orientations of the scraper carriage 2 and to estimate its displacement. This also makes it possible to have a state of the scraper carriage 2 that can serve as a basis for indexing the measurements according to the position/orientation of the scraper carriage 2. It is thus possible to compare the measurements taken from one measurement campaign to another, in the same pipe C. This inertial unit is advantageously interfaced by the processing unit.

According to another characteristic, the device 1 further comprises a battery. Such a battery is capable of ensuring energy autonomy of the scraper carriage 2, at least during a complete passage through a pipe C. It supplies the various sensors, the inertial unit and the processing unit. The processing unit can also advantageously manage monitoring charge of the battery.

Device 1 can advantageously be used by a method for detecting a tapping 8 in a pipe C. Such a method comprises the following steps. During a first step, for at least one pair of counterpart ultrasound transducers 5, 6, control of the transmitting ultrasound transducer 5 to emit a pulse. During a second step, which is substantially simultaneous, measurement, by means of the counterpart receiving ultrasound transducer 6, of the pulse reflected by the wall of pipe C. During a third step, the measurements are analyzed. Analysis leads to a diagnosis of a possible tap 8 if the reflected pulse measured has a particular signature indicative of a tapping 8.

If the tapping 8 is large enough or sufficiently aligned with the ultrasound transducers, it is possible that the receiving ultrasound transducer 6 does not see a reflected pulse. Also, a particular signature may be an absence of a reflected pulse.

If the conditions, in particular alignment, are less good, it is possible that the receiving ultrasound transducer 6 sees a reflected pulse but in a very attenuated mode. Also, a particular signature may be a very attenuated reflected pulse. It is thus possible, by observing the level of attenuation of the amplitude of the reflected pulse, to determine, via a simple threshold, whether or not there is a tapping 8. Such a "pass or fail" is advantageous in that it does not require any prior characterization.

However, it is possible, with the above approach, that diagnosis gets deceived and takes another event, such as a deformation of the wall, a crack or something else, erroneously for a tapping 8. Also, according to another more discriminating approach, signatures are used, which are compared with characteristic reference measurements obtained by means of a characterization testbench.

This approach requires prior characterization, typically carried out using a characterization testbench. A characterization testbench is here a pipe C presenting at least one and advantageously a plurality of different events, indicative of the events that can be encountered by a device 1 in an inspected pipe C. Thus, such a characterization testbench comprises at least tappings 8 of different diameters, indicative of those that may be encountered. To help discrimination, the characterization testbench also includes other events distinct from a tapping 8, such as cracks, deformations, or others.

Figure 8:
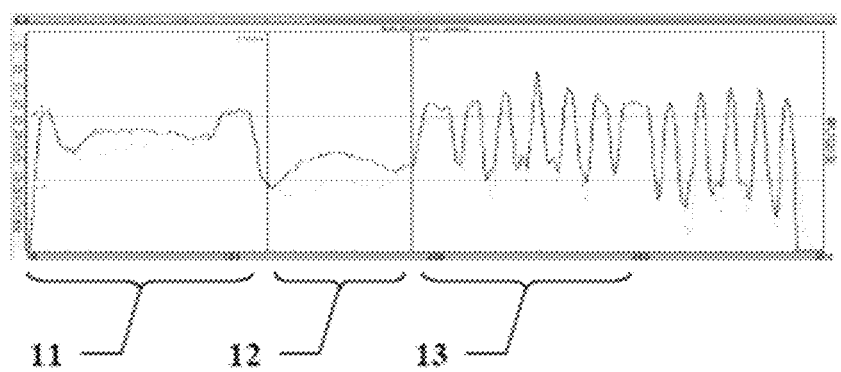
FIG. 8 shows the compared signatures of different events.

By means of the characterization testbench, the device 1 measures, by means of its ultrasound transducers 5, 6, the observable signatures, advantageously by locating them longitudinally and angularly in the pipe characterization testbench. FIG. 8 shows examples of observed signatures. Measurement 11 is a signature of a tapping 8 with a diameter of 1 mm. Measurement 12 is a signature of a tapping 8 with a diameter of 2 mm. Formal similarities can be observed, with however at least a difference in amplitude. Measurement 13 is a signature of a crack. Differences which are discriminatory can be observed. Thus equipped with a library of signatures 11-13, the device 1 can compare a measurement taken with the signatures in the library and determine, by any shape recognition method, if the measurement approaches one of the signatures. It is thus possible to provide a diagnosis specifying which element has been encountered and this in a very precise manner. Diagnosis can be based on the proximity/similarity of a measurement with a signature and/or, on the contrary, on the distance/dissimilarity of a measurement with one or more signatures.

It has been seen that the multiplication of the rings/plurality of ultrasound transducers 5, 6 allows measurement redundancy. Thus, the method can advantageously confirm, or invalidate, a detection of a possible tapping 8, when the latter is reproduced on several pairs of counterpart ultrasound transducers 5, 6, close to the pair of ultrasound transducers 5, 6 which was first to detect the possible tapping 8. Given the diversity, in particular spatial/angular, between the pair having done the initial detection and the pair carrying out the confirmation, a variation of the measurement/signature may appear. However, given the proximity (low angle A) between the two pairs, a tapping 8, or any other event, should be seen by the different neighboring pluralities.

The invention has been illustrated and described in detail in the drawings and the foregoing description. This must be considered as illustrative and given by way of example and not as limiting the invention to this description alone. Many variant embodiments are possible.

LIST OF REFERENCE SIGNS

1: device,
2: scraper carriage,
3: first crown,
4: second crown,
5: transmitting ultrasound transducer,
6: receiving ultrasound transducer,
7: scraper seal,
8: tapping,
9: foot,
10: roller,
11-13: signatures,
A: angle,
X: axis.

The invention claimed is:

1. A device for inspecting a pipe, the device comprising:
a scraper carriage, substantially cylindrical about a carriage axis substantially coinciding with an axis of the pipe which is inserted into the pipe and propelled by a liquid transported by the pipe;
a measurer carried by the carriage comprising a first crown, carrying a first plurality of ultrasound transducers, arranged on a first circle centered on the carriage axis and of a diameter substantially equal to a diameter of the pipe; and
wherein the plurality of ultrasound transducers comprises alternating groups of transmitting ultrasound transducers and groups of receiving ultrasound transducers,
each group of transmitting ultrasound transducers comprising a first transmitting transducer offset from a second transmitting ultrasound transducer by an angle less than 1 degree measured about the carriage axis;
each group of receiving ultrasound transducers comprising a first receiving ultrasound transducer offset from a second receiving ultrasound transducer by the angle less than 1 degree;
the first transmitting ultrasound transducer being arranged so that a first wave transmitted thereby is reflected by a wall of the pipe towards the first receiving ultrasound transducer; and
the second transmitting ultrasound transducer being arranged so that a second wave transmitted thereby is reflected by the wall of the pipe towards the second receiving ultrasound transducer.

2. The device according to claim 1, wherein each group of the transmitting ultrasound transducers and each group of the receiving ultrasound transducers are angularly evenly distributed on the first circle.

3. The device according to claim 1, wherein the first crown also carries in each group of transmitting ultrasound transducers a third transmitting ultrasound transducer offset from the second transmitting ultrasound transducer by the angle less than 1 degree and in each group of receiving ultrasound transducers a third receiving transducer offset from the second receiving transducer by the angle less than 1 degree.

4. The device according to claim 1, further comprising at least a second crown, angularly offset about the carriage axis, so that its ultrasound transducers are staggered relative to the ultrasound transducers of the first crown.

5. The device according to claim 1, further comprising a processing unit configured to store measurements.

6. The device according to claim 1, further comprising an inertial unit configured to measure three angles of orientation of the scraper carriage.

7. The device according to claim 1, further comprising a battery configured to ensure energy autonomy for the carriage.

8. The device according to claim 1, wherein the measurer assists in determining clandestine tappings.

9. The device according to claim 1, wherein the measurer assists in determining leaks linked to deformations due to geographical incidents.

10. A method comprising:
controlling a plurality of ultrasound transducers coupled to a carriage having a carriage axis to emit waves, the plurality of ultrasound transducers comprising groups of transmitting ultrasound transducers each comprising a first transmitting ultrasound transducer offset from a second transmitting ultrasound transducer by an angle less than 1 degree measured about the carriage axis;
transmitting from a first transmitting ultrasound transducer of the group of transmitting transducers a first wave that is reflected by a wall of the pipe towards a first receiving ultrasound transducer of a group of receiving ultrasound transducers comprising the first receiving ultrasound transducer and a second receiving ultrasound transducer offset by the angle less than 1 degree measured about the carriage axis;
transmitting from a second transmitting ultrasound transducer of the group of transmitting transducers a second wave that is reflected by the wall of the pipe towards the second receiving ultrasound transducer;
measuring the first wave and the second wave reflected by the pipe to form measurements; and
analyzing the measurements to a characteristic of the pipe.

11. The method of claim 10 wherein analyzing comprises determining a tapping.

12. The method of claim 10 wherein analyzing comprises determining leaks.

13. The method of claim 10 wherein measuring comprises measuring three angles of orientation of a scraper carriage using the first wave and the second wave.

14. The method of claim 10 further comprising powering a carriage with a battery configured to ensure energy autonomy for the carriage.

* * * * *